United States Patent
Pinault et al.

(10) Patent No.: US 9,864,433 B2
(45) Date of Patent: Jan. 9, 2018

(54) METHOD AND SYSTEM FOR HUMAN-TO-COMPUTER GESTURE BASED SIMULTANEOUS INTERACTIONS USING SINGULAR POINTS OF INTEREST ON A HAND

(71) Applicant: SOFTKINETIC SOFTWARE, Brussels (BE)

(72) Inventors: Gilles Pinault, Anderlecht (BE); Utku Salihoglu, Evere (BE); Carlos Souza, Ixelles (BE); Julien Thollot, Woluwe Saint Lambert (BE); Laurent Guigues, Brussels (BE)

(73) Assignee: SoftKinetic Software, Brussels (BE)

( * ) Notice: Subject to any disclaimer, the term of this patent is extended or adjusted under 35 U.S.C. 154(b) by 0 days.

(21) Appl. No.: 14/413,411

(22) PCT Filed: Jul. 12, 2013

(86) PCT No.: PCT/EP2013/064860
§ 371 (c)(1),
(2) Date: Jan. 7, 2015

(87) PCT Pub. No.: WO2014/009561
PCT Pub. Date: Jan. 16, 2014

(65) Prior Publication Data
US 2015/0153833 A1 Jun. 4, 2015

(30) Foreign Application Priority Data

Jul. 13, 2012 (EP) .................................... 12176458

(51) Int. Cl.
*G06F 3/01* (2006.01)
*G06F 3/03* (2006.01)
*G06K 9/00* (2006.01)

(52) U.S. Cl.
CPC .............. *G06F 3/017* (2013.01); *G06F 3/011* (2013.01); *G06F 3/0304* (2013.01); *G06K 9/00389* (2013.01)

(58) Field of Classification Search
CPC .......... G06F 3/017; G06F 3/011; G06F 3/014; G06F 3/0312; G06F 3/0304; G06F 3/0487; G06F 3/04817; G06K 9/00389
(Continued)

(56) References Cited

U.S. PATENT DOCUMENTS 5,724,264 A * 3/1998 Rosenberg ............. G01B 5/008
700/161
5,936,612 A * 8/1999 Wang .................... G06F 3/0312
345/163

(Continued)

FOREIGN PATENT DOCUMENTS

CN 102236409 A 11/2011
EP 2 474 950 A1 7/2012

(Continued)

OTHER PUBLICATIONS

IPRP and International Search Report for PCT/EP2013/064860 dated Mar. 20, 2014.

(Continued)

*Primary Examiner* — Fred Tzeng
(74) *Attorney, Agent, or Firm* — Wolf, Greenfield & Sacks, P.C.

(57) ABSTRACT

Described herein is a method for enabling human-to-computer three-dimensional hand gesture-based natural interactions from depth images provided by a range finding imaging system. The method enables recognition of simultaneous gestures from detection, tracking and analysis of singular points of interests on a single hand of a user and provides contextual feedback information to the user. The singular (Continued)

points of interest of the hand: include hand tip(s), fingertip(s), palm center and center of mass of the hand, and are used for defining at least one representation of a pointer. The point(s) of interest is/are tracked over time and are analyzed to enable the determination of sequential and/or simultaneous "pointing" and "activation" gestures performed by a single hand.

21 Claims, 6 Drawing Sheets

(58) Field of Classification Search
USPC .......................................................... 345/156
See application file for complete search history.

(56) References Cited

U.S. PATENT DOCUMENTS

| | | | | |
|---|---|---|---|---|
| 9,104,271 | B1* | 8/2015 | Adams | G06F 3/0426 |
| 9,152,173 | B2* | 10/2015 | Lee | G06F 3/0487 |
| 2002/0060663 | A1* | 5/2002 | Wang | G06F 3/0312 |
| | | | | 345/156 |
| 2009/0110292 | A1 | 4/2009 | Fujimura | |
| 2009/0254855 | A1 | 10/2009 | Kretz | |
| 2010/0023314 | A1* | 1/2010 | Hernandez-Rebollar | G06F 3/017 |
| | | | | 704/3 |
| 2010/0177039 | A1* | 7/2010 | Grant | G06F 3/014 |
| | | | | 345/157 |
| 2010/0261526 | A1* | 10/2010 | Anderson | G06F 3/017 |
| | | | | 463/31 |
| 2011/0115892 | A1 | 5/2011 | Fan et al. | |
| 2011/0197263 | A1 | 8/2011 | Stinson, III | |
| 2012/0056804 | A1 | 3/2012 | Radivojevic | |
| 2012/0069168 | A1 | 3/2012 | Huang et al. | |
| 2012/0132512 | A1* | 5/2012 | Al-Sadah | B01D 1/14 |
| | | | | 202/173 |
| 2012/0163723 | A1 | 6/2012 | Balan | |
| 2012/0314902 | A1* | 12/2012 | Kimura | G06F 3/017 |
| | | | | 382/103 |
| 2013/0033459 | A1 | 2/2013 | Guo et al. | |
| 2013/0104086 | A1* | 4/2013 | Mlyniec | G06T 19/20 |
| | | | | 715/849 |
| 2013/0278504 | A1 | 10/2013 | Tong et al. | |
| 2014/0118335 | A1* | 5/2014 | Gurman | G06T 7/0042 |
| | | | | 345/419 |
| 2014/0217178 | A1* | 8/2014 | Zhou | G06F 3/017 |
| | | | | 235/454 |
| 2014/0359536 | A1* | 12/2014 | Cheng | G06F 1/169 |
| | | | | 715/848 |
| 2015/0131852 | A1* | 5/2015 | Sweetser | G01B 11/14 |
| | | | | 382/103 |
| 2015/0199021 | A1* | 7/2015 | Jeon | G06F 3/04817 |
| | | | | 345/158 |
| 2016/0124513 | A1 | 5/2016 | Dal Zot et al. | |

FOREIGN PATENT DOCUMENTS

| | | | |
|---|---|---|---|
| EP | 2610705 | A1 | 7/2013 |
| EP | 2613223 | A1 | 7/2013 |
| JP | 2003-256850 | A | 9/2003 |
| JP | 2006-268212 | A | 10/2006 |
| JP | 2010-152791 | A | 7/2010 |
| JP | 2012-160051 | A | 8/2012 |
| JP | 2014-235634 | A | 12/2014 |
| WO | WO 2013/147804 | A1 | 10/2013 |

OTHER PUBLICATIONS

Softkinetic: 11 From Computex: SoftKinetic 1-40 announces the Depth Sense 325 and issue 3.5 11; Jun. 5, 2012 (Jun. 5, 2012). p. 1. XP054975241. Retrieved from the Internet: URL:http://www.youtube.comjwatch?v=8pQ-m4L 2oqo [retrieved on Nov. 13, 2013] the whole document.
Softkinetic: "Introducing iisu 3.5". Jun. 29, 2012 (Jun. 29, 2012). p. 1. XP054975242. Retrieved from the Internet: URL:http://www.youtube.comjwatch?v=5LvhdFudp50 [retrieved on Nov. 13, 2013] the whole document.
"Press release: SoftKinetic announces world's smallest HD gesture recognition camera and releases far and close interaction middleware" Jun. 5, 2012 (Jun. 5, 2012). XP055088011. Retrieved from the Internet: URL:http://www.softkinetic-studios.com/Portals/1/Press%20Room/20120605 PR SoftKineti c%20Announces %20World%E2%80%99s%20Smallest%20HD%20Gesture %20Recognition.pdf [retrieved on Nov. 13, 2013].
Extended European Search Report for European Application No. 14150363.1 dated Jun. 13, 2014.
European Communication for European Application No. 14150363.1 dated Jan. 18, 2017.
Japanese Office Action for Japanese Patent Application No. 2016-518540 dated Oct. 13, 2016.
International Search Report and Written Opinion for International Application No. PCT/EP2013/064860 dated Mar. 20, 2014.
International Preliminary Report on Patentability for International Application No. PCT/EP2013/064860 dated Nov. 11, 2014.
International Search Report and Written Opinion for International Application No. PCT/EP2015/050091 dated Mar. 30, 2015.
International Preliminary Report on Patentability for International Application No. PCT/EP2015/050091 dated Jul. 21, 2016.

* cited by examiner

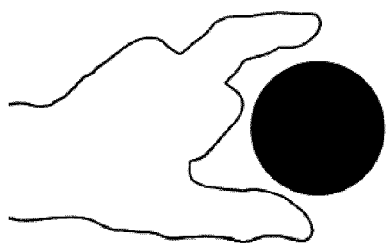
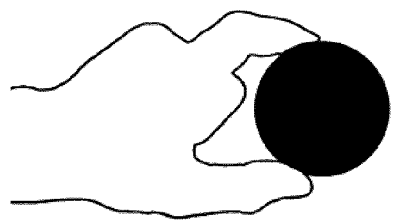
*Fig. 4a*  *Fig. 4b*
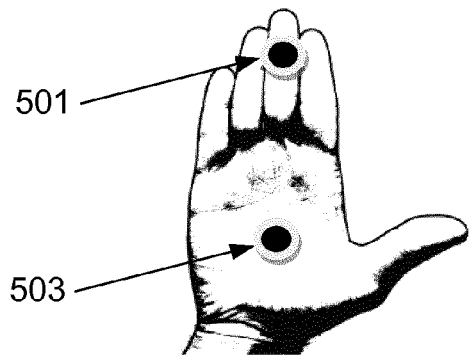
*Fig. 5b*
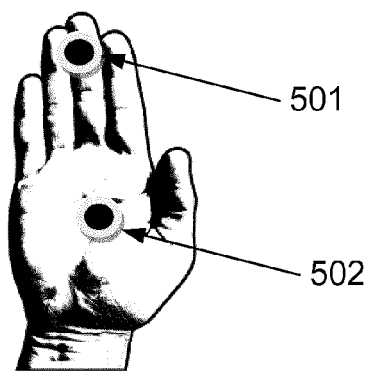
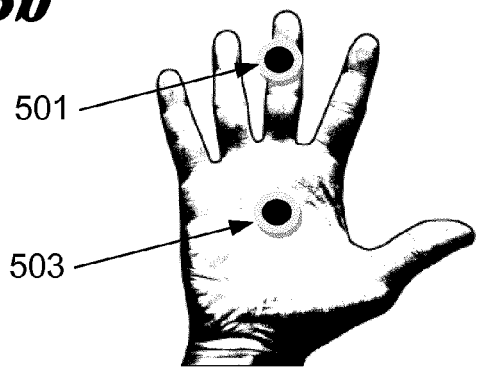
*Fig. 5a*  *Fig. 5c*
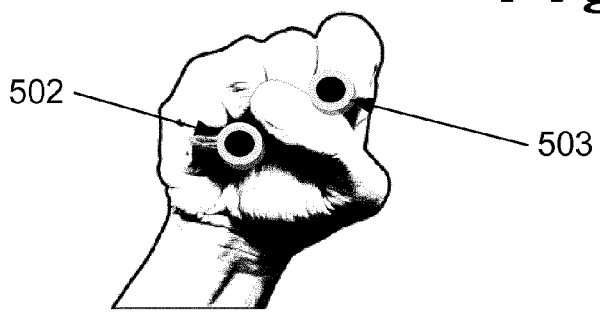
*Fig. 5d*

METHOD AND SYSTEM FOR HUMAN-TO-COMPUTER GESTURE BASED SIMULTANEOUS INTERACTIONS USING SINGULAR POINTS OF INTEREST ON A HAND

CROSS REFERENCE TO RELATED APPLICATIONS

This is a U.S. National Stage Application under 35 U.S.C. §371, based on International Application No. PCT/EP2013/064860, filed Jul. 12, 2013, which claims priority to European Patent Application EP 12176458.3, filed Jul. 12, 2012, each of which is hereby incorporated by reference in its entirety.

FIELD OF THE INVENTION

The present invention relates to improvements in or relating to human-to-computer natural interactions based on gestures performed by at least one single hand of a user, and is more particularly, although not exclusively, concerned with detection of a plurality of three dimensional (3D) gestures, such as, a pointing gesture and an activation gesture, performed simultaneously with that one single hand. The invention comprises the use of a depth sensing imaging device to capture a 3D scene comprising at least one hand of a user, and computational means enabling simultaneous recognition of the plurality of 3D gestures which can be performed at the same time by each single hand. In particular, the invention comprises means for detection, tracking in space and analysis of a plurality of singular points of interest (POI) on the hand, such as: hand extremities, finger tips, hand tips, the centre of mass of the hand and the palm centre, which are used as input for 3D gesture recognition. The invention further relates to a graphical user interface system using 3D gestures performed by the identified hand and/or fingers and their associated points of interest to enable a user to interact naturally and intuitively with a computer system using, in particular, simultaneous pointing and activation gestures.

BACKGROUND OF THE INVENTION

Conventional human-to-computer interfaces generally include hardware control system interfaces, such as, keyboards, mice, remote control and pointing devices. With such interfaces, a physical action needs to be performed with the hardware device itself, for example, touching, moving, holding, pointing, pressing, clicking, or even a plurality of these actions together, sequentially or simultaneously, in a way enabled by these device interfaces so that control commands can be sent to a computer system with which the interface is intended to interact.

More recently, natural interaction systems have appeared, for example, as described in US-A-2011/0115892, wherein conventional two dimensional (2D) cameras are used for capturing light in the visible spectrum and for the detecting a finger of a user. However, due to the limitations of that kind of technology, finger-like objects, for example, a pen, within the captured scene may be incorrectly identified or detected as fingers, or the tracking of the finger may be lost due to dependency to the scene illumination. Advanced imaging processing techniques, however, make it possible to use a conventional camera to detect a hand and to provide an input allowing the analysis of the extremities of the hand. However, using these techniques, it is still not possible to analyse accurately any other extremity present in the 3D scene, and in particular with strong robustness at different distances or strong robustness to background illumination.

In US-A-2012/0069168, colour information is used to find different hand related data or hand parameters, such as, the palm centre and the base of the palm, as well as distances from the palm centre to a contour or extremities of the hand using a mask of the hand extracted from the scene. These distances can even be used to assess whether the hand is closed or open, and, from that assessment, it can be determined if the hand is performing a gesture related to "select" or "grab". However, such gesture-based methods have their limitations and cannot provide a solid method to solve 3D pointing like interaction with a computer nor be operated in a dark environment wherein colours may not be distinguished. Moreover, the "grab" gesture detected is not very precise since distances provided are only relative measurements and thus cannot be used to "point" and "grab" a virtual object accurately at various distances from the sensor or imaging device. It, moreover, does not provide information, such as, an accurate objective distance in between two independent points of interests in the 3D scene mandatory for obtaining an accurate and reliable "grab" gesture or also mandatory for measuring the level or relative amount of a "pinch" gesture of a hand in the scene.

However, information relating to a third dimension, namely, the depth, is an important addition which can now be determined by using an input from a range sensing camera. Moreover, a range sensing camera may operate, for example, in the infrared spectrum instead of the visible spectrum. Such a range sensing camera provides three-dimensional (3D) information which opens the possibility for having a more robust, stable, reliable and accurate model of the hand of a user as scene capture is independent of the natural illumination of the scene, and as absolute size of objects and distances in between points of interest can be determined whatever is their distance from the image sensing device.

Up to now, robust detection of the hand and the tracking thereof together with tracking of the fingers of the hand or of some other associated points of interest in three dimensions has not been possible. In addition, robust recognition of different kinds of gestures performed sequentially or simultaneously by a single hand or its associated singular points of interest has also not been possible. In particular, there is currently no natural 3D gesture based interaction system which is able to determine a plurality of singular points of interest on at least one single hand in a 3D scene, and, to track these points of interest, enabling pointing and activation gestures to be recognised without false positive detection, even if these gestures are performed at the same time by a single hand to which they are associated.

In the field of graphical user interface (GUI) technologies, the use of an interface based on a pointer is common and the use of touch or multi-touch interfaces has been increasing. Representative input devices using such interfaces based on a pointer include mice and touch screens. Such input devices based on at least one pointer are advantageous in that the manipulation thereof is accurate and commands can clearly be distinguished and transferred to the GUI of an associated computer system, for example, a hardware mouse device simultaneously enabling pointing to, and activation of, a feature using a click button, which provides clear feedbacks to the user about the status of his/her interactions. However, the use of hardware can be disadvantageous as part of the feedback needs to be partially made by contact with the hardware device itself.

In the field of image processing for enabling human-to-computer interactions, several techniques have recently been developed around finger and hand detections, their tracking, their identification, and, in a very limited proportion, around the recognition of their movements in space. Moreover, real-time computer vision-based human finger recognition has mostly been focused on fingerprint recognition and palm print recognition for authentication applications. Furthermore, in order to be able to recognise a human finger in complex backgrounds, tracking finger movement and interpreting finger movements in predefined gestures have conventionally been limited by the capabilities of the imaging system and image signal processing systems supporting the imaging system. One consequence is that no effort has really been carried on the providing of clear unambiguous feedback for hand/finger 3D gesture based natural interactions.

Meanwhile, a natural interaction technique for controlling a pointer by recognising and tracking the 3D motion of a part of the body of a user, for example, the hand or a finger on the hand, is known to demonstrate a relatively low recognition ratio since there is still a need to distinguish clearly between motion corresponding to control from those corresponding to movements which are not linked to the interaction itself. A common technique to solve that problem requires non-intuitive, difficult to use special actions, such as, clear sequentially executed 'start' and/or 'stop' gestures which are not compliant with efficient single hand simultaneous "pointing" and "activation" gesture recognition. Furthermore, hand or finger gesture-based natural interaction techniques are also problematic as it is still difficult to make the displacement of a pointer attributable to motion of a user in 3D space correspond to the displacement of a mouse from the standpoint of the user. This is particularly true with GUI or interactive systems which are not developed for use in compliancy with natural-based interactions, and, in particular, with interactive systems which are not able to provide feedback to the user performing the natural gesture indicating whether the gesture has been recognised or not. This is quite different to a hardware mouse where the activation button provides a physical click as activation feedback.

SUMMARY OF THE INVENTION

The present invention, in one aspect, relates to a specific implementation for the detection of parameters and singular points of interest of at least a single hand of a user, including but not limited to the tips of the hand and fingers, in a 3D point cloud obtained from a captured scene using a 3D range finding imaging system, and in which a cluster of these 3D points represents the hand being considered. This detection is made possible regardless of the pose and orientation of the hand.

The present invention, more particularly, concerns the detection of at least a first point of the interest on a single hand, preferably a tip or an extremity, for enabling "pointing" gestures, and, in a preferred embodiment, at least two singular points of interest for enabling reliable "pinch", "grab", "click" or "snap" gestures to be identified within related sequential or simultaneous interactions.

More preferably, the invention concerns the detection of two POI on one single hand according to which, for example, at least one first POI may be determined among the detected extremities, such as, the tip of the index finger, and the other POI may be determined as being a second extremity of the hand, such as, the tip of the thumb tip. Generally, any of the fingers may be assigned as being one of the two POI required for that interaction.

In another embodiment, a first POI may be determined as being, for example, a finger tip, such as, the tip of the index finger, while at least a second POI may be determined as being the palm centre or centre of mass of the hand within the 3D point cloud. In this embodiment, the second POI may be used for pointing gestures while the first POI may be used for activation gestures triggered by an up and down movement of the tip of the index finger, namely the "snap" gesture which can be performed simultaneously with the pointing gesture without any false detection of either gesture.

In a particular form, the method comprises means for allowing a robust and efficient determination of the hand tips when some of the fingers are stuck together, for example, a first tip could be determined as being the detected tip of the thumb and the other tip could be determined as being the tip of the hand which corresponds to the extremity of the hand having the other individual fingers stuck together, the position of that extremity corresponding to an approximated averaged position of all of the other fingers tips. In the form wherein two tips are detected and the corresponding points of interest are used, the method may further comprises the determination of a third point of interest, the location of which is determined according to the two tips so as to generate an "intermediate" point of interest to be used later in the process as a pointer. In a particular embodiment, this third point is determined so as to avoid its shifting during the "pinch"-like gestures since the movement of the two points of interest, such as the tips, may not be symmetric and thus may be problematic for accurate natural interactions.

It will be appreciated that the method and system of the present invention are not limited to the detection of two tips of fingers of the hand and can also be used with more tips or POI on the fingers of the same hand and/or on several hands. In particular, the method and systems comprises means for distinguishing at least two different and opposite points of interests among several hand tips so as to automatically determine and select those being the most suitable for "pinch"- or "grab"-based interaction.

The invention, in a second aspect, relates a specific implementation for analysing the arrangement in space and in time of a set of determined points of interest, including at least the tips of the hand, and, preferably a set of points of interest associated with these hand tips and their relationship with one another. The analysis aims at detecting and recognising, in a first sub step, the movement of at least one of the points of interest over the time so as to determine dynamic gestures, such as, a "pointing" gesture or a "swipe" gesture, using a method known from state of the art. The analysis aims at detecting and recognising, in a second sub step, the arrangement in space of the points of interest at a time, that is, their respective position in space, so as to recognise specific arrangements and to determine the hand pose at a given point in time. The hand pose analysis at a given point in time may use any other method known from the state of art, such as, a pattern matching recognition method. Preferably, the hand pose recognition may use an analysis of geometrical parameters linking the points of interest together. The analysis aims at detecting and recognising, in a third sub step, changes in the arrangement in space of the points of interest over the time, that is, their respective position changes, if applicable, so as to determine dynamic gestures having a non-static pose of the hand and distinguish them from dynamic gestures having a static pose. In particular, the method comprises recognition of dynamic gestures having a non-static pose of the hand which may be at least in the form of a "pinch" or a "grab" gesture.

The invention, in a third aspect, relates to a specific implementation of a method for determining, from among the points of interest, those which are to be used as pointers for interacting with a specific system having feedback means, for example, a GUI, the design of which being compliant with the representation of at least one pointer, and, preferably compliant with the representation of two pointers. The GUI of the system is further able to represent different virtual objects having individual interaction capabilities which can be used in combination with the representation(s) of point(s) of interest of the hand(s) of a user, namely, the pointer(s). More preferably, the represented virtual objects or some portions in space of the surface of the GUI may be able to provide visual feedback to the user according to the position or to the gesture performed by the pointer(s) associated with the point(s) of interest or by the point(s) of interest itself. Even more preferably, the represented virtual objects or some portions in space of the surface of the GUI may be able to provide visual feedback in the form of a distortion, a move, a blinking, a highlighting or other means to the user when the pointer(s) associated to point(s) of interest of the hand(s) of the user, or by the point(s) of interest itself, is pointing at a specific location and/or is performing a gesture. Additionally, the pointer(s) may as well deliver a visual feedback according to its position, according to a gesture detected or according to the virtual object with which it is interacting. In a preferred embodiment of the invention, the interaction may further comprise the automatic determination of the number of points of interest on the hand and the automatic determination of the number of pointers to display, together with the automatic determination of the representation of the pointers contextually with the objects displayed onto the GUI and their interactions with those objects within the area of the GUI.

Other features of the present invention are defined by the appended claims.

BRIEF DESCRIPTION OF THE DRAWINGS

For a better understanding of the present invention, reference will now be made, by way of example, to the accompanying drawings in which:

FIGS. 4a and 4b illustrate the principle of grabbing an object using two fingers, the tips of which would be determined by the method in accordance with the present invention;

FIGS. 5a to 5d illustrate the positioning of the tips of the hand, palm centres and tips of a fist in hand postures for determination in accordance with the method of the present invention;

DESCRIPTION OF THE INVENTION

Figure 1:
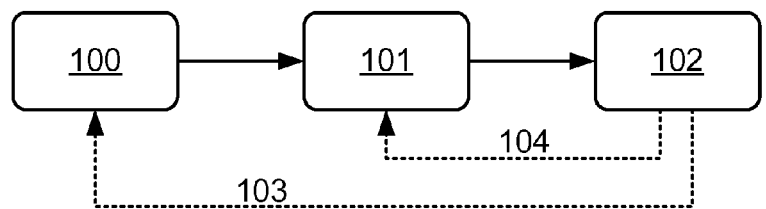
FIG. 1 illustrates a flow diagram of the three main processing steps of the method in accordance with the present invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

In addition, the particular orientations of the Figures as described below are not limiting but are shown by way of example.

The terms "natural interaction" or "natural three-dimensional (3D) gesture-based interaction" as used herein refer to human-to-computer interactions in which the human does not have to handle, carry or use any hardware device or marker, and wherein an interactive computer system is associated with imaging means, such as, a range finding imaging system like a three dimensional (3D) time-of-flight (TOF) camera for capturing and extracting, using some computation means, information provided by the user to control the computer, preferably in the form of a gesture which can be recognised by the computational means.

The terms "pose" or "posture" as used herein refer to the physical hand posture at a particular instant in time. This corresponds to a particular arrangement in space of the positions of a set of specific points of the hand, and in particular, to an arrangement, in space, of a set of singular point(s) of interest.

The terms "singular points of interest" or "point of interest" as used herein refer to the singular points on a hand of a user singular points, namely: extremities of the hand; finger tips; hand tips; the centre of mass of the hand; the palm centre; or any other point the position of which can be determined using the position of at least one of the other reliable points obtained from the hand which can be tracked with respect to time.

The terms "point of interest" or "points of interest" are referred hereinafter generally as "POI" and the determination of whether one or more point of interest is being described will be evident from the context in which the term "POI" is used.

The term "gesture" as used herein refers to a change in the arrangement in space of a POI or a set of POI with respect to time. In addition or alternatively, the term "gesture" may also refer to a change in the position of an unchanged arrangement of the POI in space with respect to time. If the pose does not change with respect to time, that is, the arrangement of POI within space remains unchanged, it is described as a static gesture. If the arrangement of POI remains unchanged and the position of the arrangement changes within space with respect to time, this can be described as a dynamic gesture having static pose. If the arrangement of POI changes with respect to time, this is described as a dynamic gesture having different poses.

The term "hand tip" as used herein refers to a single POI which corresponds to the main extremity of the hand. It may be more particularly located at an average position close to the extremities of the fingers.

The term "finger tips" as used herein refers to several positions in space representing each individual finger tip, or finger extremity. Each individual finger tip is typically considered to be a POI.

The term "hand tips" as used herein refers to the hand tip and also to the finger tips.

The terms "pointer" or "pointers" as used herein refer to the representation in the virtual world of a POI or a set of selected POI.

The term "grabbers" as used herein refers to a predetermined number of pointers being associated with POI on the hand. They basically comprise at least two pointers used to identify the meaningful extremities of a hand when a user is performing a "pinch gesture" with at least one of his hands. When using the thumb and the index finger, the tips of the thumb and of the index finger respectively comprise the lower and upper "grabbers". If more than two fingers are used, the lower "grabber" may be fitted on the thumb and the upper "grabber" may be an average position of the other fingers. In addition, the use of the terms "lower grabber" and "upper grabber" refer to the orientation of the associated POI with respect to the scene. Depending on the orientation of the POI within the scene, the "lower grabber" and "upper grabber" could, in effect, be considered to be left and right "grabbers".

The term "pointing" as used herein refers to a "pointing gesture". It corresponds to, for example, using at least one of the hand tips, or the associated POI, as a real world user related reference 3D position, that is, a position in space corresponding to an extremity, which can be used for determining, in virtual space, the position at which a virtual representation of a pointer is located. The determination of the position of the virtual representation of a pointer can be achieved according to several methods including, for example, using the absolute positioning of a user POI in the real world 3D space, using the relative positioning of a user POI in the real world 3D space with respect to a determined reference 3D position, or using a relative positioning determined by the principal direction of a vector set in between two POI, for example, the direction defined by the vector from the palm centre to the index finger-tip. It will be appreciated that "pointing" may additionally make use of several pointers, including, for example, using a statistical mode of the positions of at least two POI. The statistical mode may be, for example, at least one of: the mean; the median; the maximum; the minimum or a weighted sum of their positions.

The term "activation gesture" as used herein refers to a gesture recognised by the system and which is used as an event trigger similar to that of a mouse click. Activation gestures may comprise: "pinch" gestures, finger "snap" gestures, and/or "grab" gestures.

The term "pinching", with respect to ergonomics considerations, refers to a closing of the hand so that at least two POI or their corresponding pointers selected from among those representing parts of the hand are made to become closer together. "Pinching" may be a recognised gesture to be used for activation. Distance or relative distance inbetween the two POI may additionally be used for determining a value associated to the level or amount of the "pinching" gesture.

The term "grabbing", with respect to ergonomics considerations, means closing the hand so that at least two POI or their corresponding pointers selected among those representing hand parts are made to become closer together until the distance between their representations in a virtual world corresponds to the size of the representation of an object or virtual object to be "grabbed". At that time, the object may be considered to be "grabbed" and can be manipulated in the form of, for example, being squeezed, moved, oriented, translated, dragged and dropped and so on, as function of the gesture performed by the user. "Grabbing" may be a recognised gesture.

The term "snap gesture", with respect to ergonomics considerations, refers to up and down movements of a POI corresponding to a finger tip, preferably the tip of the index finger, or the hand tip, or of their associated pointers. A "snap gesture" is typically a gesture used as an activation gesture for triggering events, such as, a click in a human-to-machine interaction system.

The term "hand parameters" as used herein refers to at least the following parameters relating to the hand: the hand tips, the centre of the palm (termed "palm centre"); the radius of the palm (termed "palm radius"), the normal to the palm (termed as "palm normal"), the openness of the palm (termed "palm openness"), the base of the palm, and the distance from the palm centre to the hand contour.

The terms "virtual representation" and "representation" as used herein correspond to the digital illustration in a virtual world of an interacting object. This interacting object may be an object from the virtual world itself, for example, a folder from the GUI of an operating system with which a user may interact. This interacting object may also be the digital illustration in a virtual world of a real interacting object from the real world, for example, a hand of a user the position of which is tracked over the time to enable pointing or mouse pointing interactions in the virtual world with the GUI of an operating system.

The present invention relates generally to an apparatus and method for providing a contactless natural interaction system, and, more particularly, to an apparatus and method for providing a natural interaction system for controlling at least one mouse pointer in a contactless manner using control determined from the 3D positions and the 3D gestures from the fingers of the hand and/or the hand itself and/or parameters of the hand. In particular, robust and reliable pointing and activation gestures, such as "pointing", "pinching", "grabbing" or "snapping" gestures and their derivatives, may be detected to improve the ergonomics of 3D natural interactions with a system providing appropriate contextual feedback in accordance with those pointing and activation gestures which may further be performed not only sequentially but also simultaneously.

The method of the present invention is not limited to classical mouse-type interaction, as it is based on 3D hand gesture recognition which can provide multi-touch screen kinds of interaction or simply more natural interaction than a conventional mouse when it comes to efficient detection of pointing and activation operations.

In accordance with the present invention, a method and a system are provided so as to enable human intuitive natural interactions with a computerised system in relation to information relating to hand gestures information extracted from the data provided by a range finding camera device, that is, a depth map or a 3D point cloud (also termed a set of vertex or vertex). The interactions make use of predetermined hand parameters, namely, the hand palm centre and the hand tips to determine at least one pointer, and, preferably at least two, so as to interact contextually with a GUI designed accordingly.

The method comprises the following three main steps:

A first step includes the detection of at least one hand parameter and of its singular POI which comprise at least the palm centre and the hand tips. The aim of this first step is to determine several relevant POI, namely, the singular POI or the POI, which may be used for determining individually or in combination pointers which can be used for further interactions.

A second step includes the tracking and analysis over the time of a selection of at least one POI or of its associated pointer in order to detect gestures interactions. According to the number of POI selected, at least a pointing gesture can be determined. If, in accordance with a preferred embodiment of the present invention, at least two POI are used, "pinch", "grab" and "finger snap" gestures and their potentially associated interactions, such as "click" or "double click", may be determined independently or simultaneously with the pointing gesture.

In this step, there are various gestures that are recognised, for example:
  (i) A "pointing" gesture using a single POI on the hand, where such a single POI may be a finger tip, a hand tip, the palm centre of the hand, etc.
  (ii) A "pointing" gesture using at least two POI on the hand, where, in one embodiment, interpolation between the two POI positions effectively provides another POI which acts as the pointer. The two POI used for interpolation may be: two finger tips; one finger tip and the hand tip, preferably, for example, the thumb as it is ergonomically opposed to the finger tip; one finger tip and the palm centre of the hand. In another embodiment, the "pointing" gesture is determined using a direction vector in between the two POI, for example, a finger tip and the palm centre. It will be appreciated that any two suitable POI can be used for the basis of the interpolation or for the determination of the direction vector.
  (iii) An "activating" or "activation" gesture using: at least one single POI, for example, the "push" gesture using the palm centre; at least two POI for "pinch" and/or "grab"; or a moving POI and a stationary POI for the "snap" gesture.
  (iv) Simultaneous "pointing" and "activation" using at least two POI using, for example, the palm centre for pointing and one finger tip for activating in a "snap" gesture, or two finger tips for a "pinch" and/or "grab" gesture.
  (v) Simultaneous pointing and activation using at least three POI using, for example: the palm centre with two finger tips; the palm centre with one finger tip and one hand tip; two finger tips and an interpolated POI; or two finger tips and a palm centre together with an interpolated POI. In a preferred embodiment, the position of the "pointing" pointer is interpolated from the two POI and made invariant to rotation and individual movements of those two POI when they are used simultaneously to perform gestures other than the "pointing" gesture.

A third step includes the use of the pointers and gestures detected in relation to a system having a GUI comprising virtual objects and delivering contextual feedback to enable ergonomic, intuitive and natural interactions, for example, highlighting of the objects and squeezing the form of the objects, when interacting with the representation of POI of the hand of the user.

According to an embodiment of the present invention, FIG. 1 illustrates a flow diagram illustrating the three main processing steps of the method, namely, the detection of hand parameters (step 100), the determination of POI and tracking and analysis of their movement and postures (step 101), and the contextual determination of the interaction between the representation(s) of point(s) of interest and a compliant natural contactless gesture based GUI (step 102). A feedback control loop is provided from the contextual determination, in step 102, to the detection of hand parameters in step 100, as indicated by arrow 103. In addition, a further feedback control loop from the contextual determination in step 102 to the determination of POI and tracking and analysis of their movement and postures in step 102 as indicated by arrow 104.

The first step (step 100) of the present invention aims at detecting hand parameters, including in particular hand tips, that is, a hand tip and finger tips, so as to be able to provide at least one stable POI. Preferably, the method may further comprise the detection of: an upper POI and a lower POI from which the stable POI may be determined.

Additionally, if not already available, the method may also comprise the determination of at least one of the following parameters: the palm radius; the hand openness; and the palm normal.

Using at least one point of interest from among those determined, the method further comprises determining at least one pointer for interacting with a system as will be described in more detail below in relation to step 102. Preferably, the method comprises determining at least two pointers associated with an upper and a lower POI corresponding to the hand tips for performing interactions.

The first step of the present invention uses input information including at least: a depth map or a corresponding 3D point cloud (that is, a set of vertices) comprising at least one hand of a user and a label image. [The 3D point cloud is segmented into several clusters, each of which being labelled]. The label(s) of the identified hand(s) to be used and a predefined value determining the number of control points to be determined (this predefined number of control points being optionally provided by the user interface due to the feedback control loop as indicated by arrow 103 if enabled). Additionally, a predefined value determining the number of pointers to be determined may also be used (this predefined number of pointers may be provided by the user interface due to the feedback control loop as indicated by arrow 103 if enabled).

Figure 2:
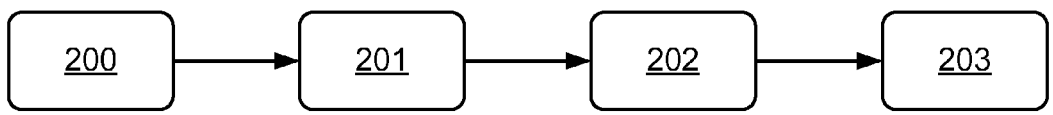
FIG. 2 illustrates a flow diagram of the four sub-steps of the first main step of the method in accordance with the present invention.

The first step of the present invention, step 100, comprises four processing sub-steps as shown in FIG. 2, namely, the detection and determination of the hand palm centre and of the hand tips (step 200), the determination of the point of interest (step 201), the determination of the pointer(s) using the POI (step 202), and the determination and/or the refining of other additional hand parameters, such as, the openness and the palm normal (step 203).

Figure 8:
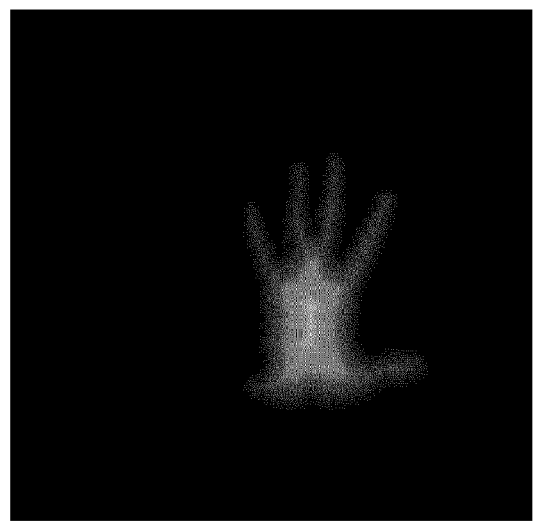
FIG. 8 illustrates the distance map of a hand.

Step 200 comprises first the detection and determination of the hand palm centre which requires a prior computation of "a distance transform" the output of which is a distance map of the identified hand to be used. The distance map of the hand is an image in which each pixel of the hand has a value equal to the distance in a metric system to the closest border of the hand such as illustrated in FIG. 8. In particular, in FIG. 8, the labelled hand to be used is isolated from the other useless labelled parts of the user and from the background. In the Illustration, the darker the content of each pixel in the hand representation, the farther this pixel is away from the border of the labelled hand. Such a distance map image may be computed using two passes on the binary label image of the hand.

Several methods may be used for performing the distance transform. However, one important point in the present invention is that the distance value obtained for each pixel can be related to a metric distance in the real world since each pixel of the label image corresponds to a position in the 3D point cloud, and as each distance in the distance map corresponds to a distance metric in the real world. For example, the distance transform may be carried using a two pass process in which the first pass is from the top-left corner to bottom-right corner of the binary label image, and the second pass is in the opposite direction. For each pass, distances are accumulated for each pixel which corresponds to the sum of the minimum values of all of the direct neighbouring pixels already processed by the pass. For instance, in the first pass the direct neighbour for a pixel may be the pixel to the left, to the diagonal left, to the top and to the diagonal right. The distance determined for the current pixel may be determined as being the minimum value of the four neighbouring pixels plus one. Furthermore, to account for basic geometrical properties of the pixels, the value of horizontal/vertical neighbouring pixels may be weighted by a predetermined factor, for example, by a value of 5, while those of the diagonal neighbouring pixels may be weighted by another predetermined weighting factor, for example, by a value of 7. The 7/5 ratio corresponds to a preserving ratio between a diagonal and a side of a typical square pixel ($7/5 \approx \sqrt{2}$).

To find or approximate the palm centre position, the process comprises at least determining the pixel location at which the distance information intensity is the maximum value of all other of the pixels of the hand, and, in a preferred embodiment, minimising the distance to the previously determined palm centre may be considered for enabling smooth changes in position of the previously determined palm centre position.

Secondly, step 200 comprises the determination of the hand tip using a Principal Component Analysis (PCA) carried over the 3D point cloud of the hand. Using a vector the origin of which is set as being the centre of the palm, and the direction of which is set as being the principal direction given by the PCA, an histogram is computed so that a count of the number of pixels of the hand which are orthonormal to that vector and which can be projected on each section of that vector. A section of the vector may be represented, for example, by a distance metric of 1 mm step. Using the so determined histogram, the hand tip may then be determined as being the area corresponding to the section of the vector for which the minimum of hand pixels have been projected. In one preferred most robust embodiment, a range between two predetermined threshold may be defined, for example, a 95 to 99% range, corresponding to the section of the histogram having the less projected pixels, and thus corresponding to the thickest section of the hand along the principal direction of the hand in space which is supposed to be the hand tip.

Thirdly, step 200 comprises the determination in three-dimensions of the hand tips which are areas corresponding to the hand extremities approximating finger tips. To do so, a "response image" is determined as illustrated in FIG. 9b. In the response image, the value of a pixel represents the difference in depth between the pixel being considered and its eight neighbours. A high value indicates a high probability of being an extremity. The value for each pixel is computed from eight neighbours along the common eight directions (that is, up, up-left, right, down-right, down, down-left, left, up-left). In each direction, the pixel that is at a distance of 2 cm of the current point is considered. To find out to which pixel corresponds a projection of a distance of 2 cm in each direction, the specification of the imaging device or camera is used together with the depth value of the current point. This operation is, of course, only done for valid pixels. For those eight pixels, a difference in depth with the current pixel is determined, and the value of the current pixel is taken to be the third smallest value. The third smallest value is chosen because it is easy for any non-extremity to have a large value by not being connected on one side (for example, the side of the palm) and it is desired that those parts of the hand do not provide a response as a finger. Yet even a finger can have some direction in which they are connected to the hand. For this reason, the two directions with the two smallest response values are ignored.

Figure 3A:
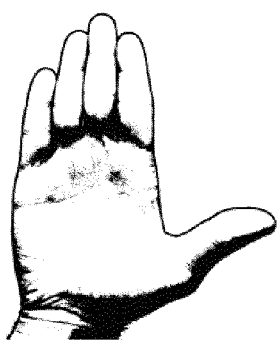
FIGS. 3a to 3f illustrate different possible postures or poses of a hand of a user to be considered when making determinations of some hand parameters.
Figure 3B:
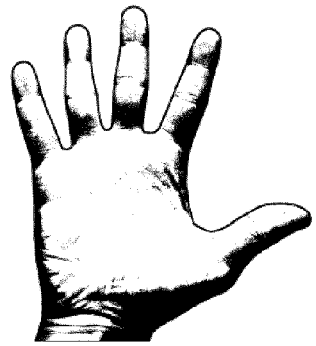
Figure 3C:
Figure 3D:
Figure 3E:
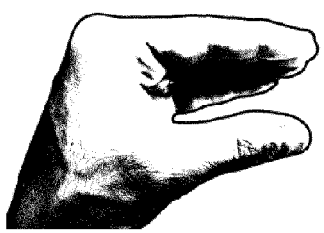
Figure 3F:
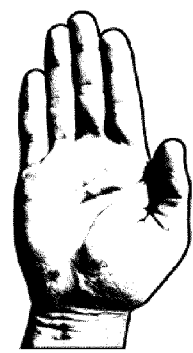
Figure 10A:
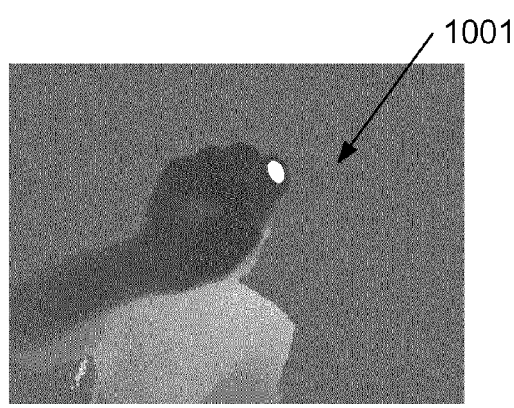
FIGS. 10a and 10b illustrate respectively a depth map of a hand assuming a closed "pinching" attitude and the corresponding response map.
Figure 10B:
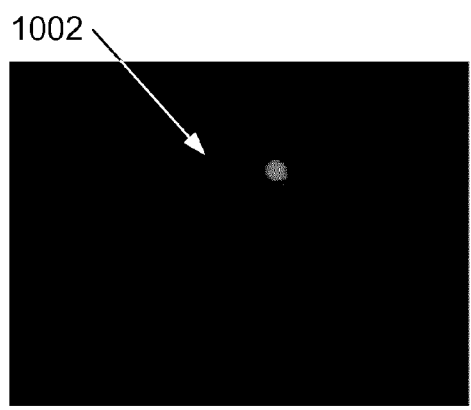
Figure 11A:
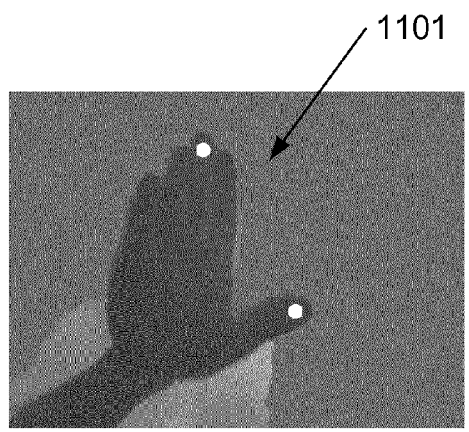
FIGS. 11a and 11b illustrate respectively a depth map and corresponding response map where the thumb produces a clear response signal and where the other response corresponds to the hand tip.
Figure 11B:
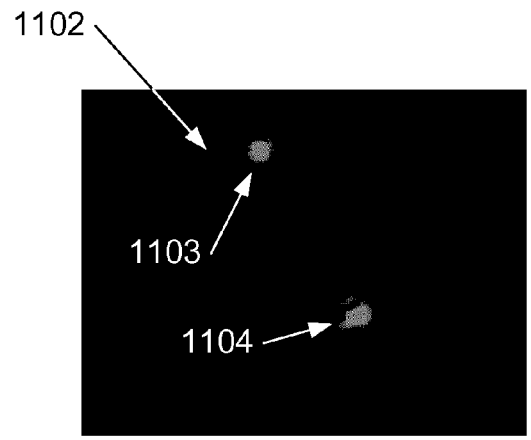

Unfortunately, some situations will not provide a proper response for each physical extremity of the hand, for example, a closed fist will provide one single response corresponding to the hand tip such as illustrated in FIG. 5d, and a "stop" (open palm such as illustrated in FIGS. 3f and 5a) will only provide a response for the thumb, none for the other individual fingers, and one single other response for all the other fingers stuck together such as illustrated by a 1 cm radius circle on the response image in FIGS. 11a and 11b. In FIGS. 10a and 10b, a circle of the hand tip is indicated, at 1002, in the response image (FIG. 10b) where, from the depth image at 1001 (FIG. 10a), it is clear that there are no clearly defined extremities. This illustrates the robustness of the present method in that it always provides a valid solution giving at least one POI for "pointing" whatever the hand pose.

In the example shown in FIGS. 11a and 11b below, there are only one single response for the thumb and one single response for all the other fingers stuck together providing two reliable POI which can be selected as "grabbers" for further interactions.

Additionally, a smoothing filter may be applied on the response image in order to clean up each individual responses using, for example, a classic Gaussian filter as is known.

Furthermore, based on the smoothed response image and the y image, a connected component image may be determined. This corresponds to a label image which gives the same label to two adjacent pixels if, and only if, they both have a positive response value in the response image, that is they are extremities, and are close enough in depth (<1 cm). In other words, two neighbouring pixels will not have the same label if they have a depth value difference greater than a predetermined threshold, for example 1 cm, or if one of them does not have a positive response value in the extremity response image. This image may then be used for two purposes: the first is to allow grouping extremity responses together to form finger tip candidate and to remove unwanted small responses from the image. If a component is smaller than a predetermined threshold, for example 1 cm, it may be rejected.

In one embodiment, the step of determining POI comprises determining at least one single POI by selecting at least one point among the previously determined hand parameters including at least, the palm centre, hand tip, hand tips, or a combination of these parameters. This requires, for example, defining a single one of these parameters as being the POI. This may require, for example, defining two of these parameters as being the POI. This may also require defining an average position of a set or a subset of the hand parameters and POI.

In another embodiment, the step of determining POI comprises determining at least two POI by selecting at least two of the hand parameters or a combination of one hand parameter with several other hand parameters. Preferably, when considering interactions using two points of interest, used, for example, for "grabbing", a third POI may be used for "pointing" and may be determined according to these two POI.

In particular, determining POI from the labelled responses corresponding to the hand tips may be achieved by computing a weighting for each labelled response (namely the component) in the response image based on distance to others (the more isolated the component, the larger its weighting). The response image needs to comprise at least one labelled component. In the case where two pointers are expected, the response needs to be separated into at least two groups. Each group will be used to compute the position of one of the pointers or "grabbers". To this end, it is necessary to find the centre point from amongst the points of the hand that have a positive response in the extremity response image. If a simple weighted sum of all the points of the hand using their responses in the extremity response image is taken as a weighting the palm centre obtained will be biased toward the upper part of the hand since there are more fingers visible and thus stronger responses in general in that region. To avoid that, not only weighting of the response is used but also a factor according to the component to which the response belongs.

If a component is far from all other components, it will have a larger weighting, and if it is close to other components, it will have a smaller weighting. This ensures that the isolated finger (in most cases, the thumb) get a higher weighting than the rest of the fingers when they are visible. If only one other finger is visible, by definition both fingers will have the same weighting. The distance is normalised by the hand span which is computed as the hand radius multiplied by, for example a factor of 5.

The centre of the extremities is computed as a weighted sum using their weighted responses and the weighting associated with their components.

Once a centre has been determined, it is used to separate the response in 3D Cartesian space. To do so, a plane passing through the determined centre point is used. Since the goal is to have, preferably, the thumb on one side of that plane and the rest of the fingers on the other side, the direction from one POI (or "grabber") to the other is taken as the normal to the plane, which coupled with the centre point, provides a complete definition of the plane.

However, in order to better track and deliver reliable points of interest over time when considering these points as "grabbers", that is ensuring the reliable determination of their respective positions over time with respect to their positions from the previous frame, t−1 (where the current frame is t), may preferably be used. For the first frame, the up axis is used as a reference. This choice has no impact as the algorithm converges to the correct orientation even if the initial axis is wrong. The up axis is chosen because it is the most likely general direction of the "grabbers" in a usual pose.

Given the plane from the previous step, points of the hand are sorted according to their side of the plane, and, using the barycentre for each group, best candidates for the two "grabbers" can be obtained, for example, as being those the closer to each barycentre.

Pointers may then be determined as being one of: the hand tips; the palm centre; and the POI. In a preferred embodiment, having determined the "grabbers", an additional stable pointing coordinate in between the grabbers may be computed. It may be the centre of the "grabbers" adjusted by the movement of the palm centre. However, the value of this point is updated only if the palm centre has moved more than, for example, 3 mm. This guarantees that, even if the user "pinches", if he/she is not moving his/her hand the pointer will not move. To avoid jitter, this process is not binary but instead is smoothed for hand movement in the range of between 0 and 3 mm by a simple linear regression between the centre of the new "grabbers" and the stabilised point of the previous frame.

Additionally, the palm normal may be used to determine the orientation of the palm itself. The palm normal is adjusted using the angle between the vector from the palm centre to the pointer position and the previously determined palm normal. This angle is weighted according to some custom parameterisation to make a smooth blending between the two information sets. The palm normal is computed using PCA and the least important direction is the palm normal. This normal is also blended with information such as the camera direction.

Additionally, the palm radius may obtained from the distance map, that is, the value of the distance map divided by a predefined factor, as for example 5, so that to provide an estimate of the distance to the closest border of the hand, and, using the specification of the camera and the depth value at the current location of the palm centre, the palm radius can be estimated in millimeters.

Additionally, a hand openness which is a Boolean value that expresses whether the hand is open or closed may be also obtained. A hand is considered closed if there is no fingertip is detected. The hand openness may be updated using the ratio in between the "grabbers" distance and the palm radius. If the ratio is smaller than a predetermined threshold and if the hand was previously considered opened, the openness of the hand will be adjusted and be marked as closed. If the ratio becomes greater than another predetermined threshold, the hand will be considered to be open.

In summary, the output from the first step of the present invention comprises preferably determining at least one POI, the 3D position of which is to be used for performing 3D gesture-based interactions, and preferably at least two POI the position of which being for use in 3D gesture recognition based interactions compliant with simultaneously one single hand performed pointing and activation 3D gestures.

The second step (step 101 in FIG. 1) of the present invention comprises tracking and analysis over the time of a selection of POI or of their associated pointers in order to detect gestures and interactions. According to the number of POI selected on the at least one single hand, different gestures may be determined independently, alone or simultaneously.

For gesture determination, first the position in space over the time of each POI is used for tracking and pointing purposes. The tracking from frame to frame ensures a consistent "pointing", especially when using at least two POI represented by at least one pointer, or, preferably represented by two pointers. In one embodiment, a single POI may be used. This POI may be designated as being the pointer for enabling a pointing feature, and may be determined as being one of the hand tips detected in the previous step as described above. For example, the pointer may be the palm centre if no hand tips are available, the hand tip if no reliable finger tip is available, the index finger tip if available as it is naturally used for pointing, or any other finger tip if required, or another point the position of which in 3D space is computerised using at least two of the predetermined hand parameters from among the palm centre, the finger tips, and the hand tip. In accordance with a preferred embodiment of the invention, the analysis of the change in position of each pointer representation on the GUI, or of a at least one POI, may further be analysed using a conventional gesture recognition method for determining dynamic gestures in the form of, for example, a "wave", a "push", a "swipe", a "circle", a "finger snap" or another dynamic gesture. The determination of such dynamic gestures is used for triggering events to be used as inputs for the interactive GUI. This may be in combination with the position of at least one pointer and the object which is pointed to by the pointer, but this is combination is not essential.

Secondly, in the gesture determination, the position in space at a given time of the determined POI with respect to one another is used for determining hand postures. Unchanged hand postures without change in position of the hand along time are determined as being static gestures. A static posture is an arrangement in space of a subset of hand parameters. For example, an open hand with the thumb unconnected may correspond to a "stop" posture or to a gesture the arrangement of which being defined by the formation of a right angle between the thumb tip, the palm centre and the hand tip. The detection of postures can be achieved using several methods known in the state of the art, such as, using a shape matching technique. However, in accordance with a preferred embodiment of the present invention, determining the hand posture comprises detecting the geometry of the arrangement in space of the subset of POI. Each of the determined POI, including at least one of the hand tips and the hand palm centre, are connected to one another. Distance and direction of the links between the POI, and the properties of their intersections (angle of value) are computed to determine a set of data parameters. According to the number of POI and their so defined data parameters, the position is determined by comparison with a database comprising the main postures to be detected. For each frame, if one of the expected hand posture is detected, an event may be triggered to drive the interactive system.

Thirdly, in the gesture determination, the change in position in space over time of the determined POI with respect to one another, that is, the change in hand posture over time, is used for determining hand dynamic gestures in the form of, for example, a "pinch", a "grab", a "click", a "snap" or other gesture.

For example, in an embodiment of the present invention, the method comprises the analysis of at least two hand tips defining POI and the associated pointers for enabling "pinch" dynamic gesture detection. As described above, a "pinch" may correspond to two opposed tips optionally displayed as pointers which are able to move towards one another, the distance between the two hand tips or associated POI or pointers allowing the determination of the degree of "pinching".

In another embodiment of the present invention, a "click" dynamic gesture may be determined if the "pinch" for which at least two "grabbers" touch one another for a certain period of time and then return to a non-contacting status/posture.

A "grab" gesture may be detected contextually when interacting with a virtual object represented in a user interface. The "grab" comprises the detection of at least two POI which may be represented in the GUI in the form of two pointers. The "grabbing" may be detected when the two pointers touch the virtual object at two opposite sides thereof.

A "push" gesture, if enabled by the user interface, may be detected when the representation of at least one pointer touches a virtual object representation, and continued movement of the pointer pushes the virtual object representation within the GUI.

A "finger snap" or more simply a "snap" gesture, if enabled by the user interface, may be detected when at least two POI are selected on one hand. A first POI, preferably corresponding to an approximation of the palm centre or to the centre of mass of the hand, provides a 3D position which can be used for the pointing gestures, while the second POI, preferably corresponding to a finger tip, such as the tip of the index, provides 3D positions being for "activation gesture" recognition. The up and down natural movement of the POI, at a determined velocity, with a determined amplitude and duration defines the "finger snap" (or "snap") gesture which can be used as a reliable event trigger interaction. The reliability of that particular embodiment relies on the fact that the fingertip position is uncorrelated to that of the hand palm centre despite both are those of the same hand.

The third step of the invention comprises a method and system enabling human to computer contactless interactions with a GUI. The method concerns the means for controlling the interface and the system concerns the means for displaying the interface and visual feedbacks. The method and system benefit from input information comprising distance measurements and related information, such as, the pointing and activation gestures extracted from the POI which are independent from the distance of the hands to the range finding imaging system or camera in contrast to the conventional 2D contactless interactive systems. In the present invention, the interactions rely on the analysis of spatio-temporal properties of POI of the hand and gestures determined using the steps described above over time, and, in particular, the analysis of the virtual representation of the POI, namely, the pointer(s) contextually with respect to virtual objects, for example, "pointing" interactions, "grabbing" interactions, manipulation interactions (for example, "pinching", rotation, "drag and drop", "push"), and click interactions (for example, "finger snap" or "snap").

The following description relates to embodiments illustrating different aspects of the present invention, these embodiments should be considered as a non-limiting use of the hand parameters extracted in the steps described above for interacting with virtual objects displayed on a screen.

In a first embodiment describing "pointing" interactions, the method may comprise using a singular POI, namely the palm centre as determined above as the reference POI to determine the position of the pointer representation in the virtual world space. Changes in the position of the palm, with respect to time, triggers changes in the position of its representation in the virtual space over the time. The transformation of the real world positions to the virtual world positions may be linear computations using a 1-to-1 absolute ratio or linear computations using a 1-to-x relative ratio, where the x factor can be predetermined by the user, a non-linear computation using, for example, a polynomial transformation ratio predefined by the user, or may have a ratio dependent on the distance of the hand to the imaging device.

In another embodiment, a similar method may comprise using the hand tip reference position to determine the position of the pointer representation in the virtual world space over the time. In this particular case, the hand tip is determined whatever the configuration of the fingers, that is, whether they are all joined together, partially joined together, or all separated from one another. Examples of configurations of the fingers are illustrated in FIGS. 3a to 3f.

In a further embodiment, a similar method may comprise using the fist reference position (FIG. 3c) to determine the position of the pointer representation into the virtual world space with respect to time. This particular case may correspond to a hand for which no individual finger tips can be detected, and, for which, for example, the closest position of the hand to the range finding imaging device is determined as being the fist tip.

In one preferred embodiment, a similar method may comprise using at least one single finger tip reference position to determine the position of the pointer representation in the virtual world space with respect to time. This particular common and natural way to point to things in real life using one single finger tip may correspond to, for example, using the "index" finger tip position over time, or in another embodiment, using the finger tip direction determined using, for example, the principal direction of the hand tip.

In one another preferred embodiment, the method may comprise using several hand parameters to determine the position of a single pointer representation in the virtual world space over time. For example, the method may use a weighted sum of at least two hand parameters to determine the position of the single pointer representation. The single pointer position may correspond to a position in between the selected hand parameters. For example, it may correspond to a position in between the hand tip and a disjoined finger tip, such as, the tip of the thumb, the respective distance to the mentioned tips being modulated by the predetermined weighting factor. In particular, when considering a disjoined finger tip such as the tip of a thumb and another hand tip or finger tip, asymmetry of the "pinch" movement may require a greater weighting factor related to the a disjoined finger tip position than the weighting factor related to the other tip since the other tip will move with a greater amplitude than the tip of the thumb. Such a particular weighted computation (or interpolation) aims at obtaining reliable and stable pointer position for pointing gestures, while the two POI from which the position of the pointer is derived, are performing another gesture, for example, activation gestures, such as, "pinch" and "grab" gestures, the lower pointer position being considered, for example, as the one which performs the smallest movements, and, as such, being the one that comprises the larger weighting factor. The pointer position (derived from the two POI) is invariant to independent movement of the individual POI when these POI are performing an activation gesture, and to hand rotation.

As another example, the determination of a suitable weighting factor of a pointer is to consider the distance of each hand parameter corresponding to these pointers to the palm centre; the closer one being the one which is supposed to move less and therefore has the largest weighting factor. This another example being particularly suitable when expecting weightings invariant to hand orientation and independent from identification of hand tips and finger tips.

In one another preferred embodiment, the method may comprise using several hand parameters to determine the position of several pointer representations in the virtual world space over time. For example, the several pointer representations may include an individual representation of at least two hand parameters such as a "pointer" corresponding to the hand tip and a "pointer" corresponding to the tip of the thumb. In derivative embodiments, more than two pointers may be determined. One other simple example corresponds to the determination of three pointers to be represented in the virtual world. These three pointers may be the hand tip, the tip of the thumb, and another POI which would correspond to a weighted position in between these two hand parameter positions.

In one further embodiment, the method may comprise automatically defining the number of pointers represented according to the hand posture since this posture may or may not allow the reliable detection of the hand parameters.

In one another further embodiment, the method may preferably comprise automatically defining the number of pointers to be represented contextually with the GUI used, and, in particular, according to the objects represented in this GUI. For example, the method may define one single pointer which will correspond to the hand tip in order to parse the screen area with a pointer representation. At a specific location where the screen area comprises, for example, a folder representation which is compliant with at least two pointers interactions, for example, by being graspable, the interface will define two pointer representations which will correspond to two hand parameters, such as, for example, the hand tip and a disjoined finger tip such as the tip of thumb. Movement of these pointers will then allow "grabbing" manipulation of the folder as authorised by the GUI.

In a second embodiment, "grabbing" interactions, the method comprises using the palm centre determined as described above as the hand parameter defining the reference position to determine the position of a single pointer representation in the virtual world space. The method comprises further determining two POI on the hand, for example, the hand tip and the tip of the thumb. The interaction then comprises pointing towards a virtual object enabling the "grabbing" feature. The "grabbing" of the virtual object will occur when the two POI move close to one another to a distance below a predefined threshold. At that time, the representation of the virtual object will be associated to the position of the pointer representation and will then move accordingly. The virtual object will be released (no longer "grabbed") at the time at which the distance between the two points of interest reaches a second predetermined threshold.

In another embodiment, the method comprises determining two POI from among the hand tips, and determining two pointers accordingly, so as to obtain a visual feedback of these two pointers which may correspond to, for example, the hand tip and the tip of the thumb. The interaction will then consist of pointing towards a virtual object enabling the "grabbing" feature. The "grabbing" of the virtual object will occur when the two POI each enter into contact with borders of the virtual object representation with respect to certain limits encompassing some predetermined threshold, for example, to compensate for potential accuracy issues with the camera or range imaging device. At that time, the representation of the virtual object will be associated with the position of the pointer representation and will move accordingly. The virtual object will be released (no longer "grabbed") at the time at which the distance between at least one pointer and the border of the object reaches a second predetermined threshold.

In another preferred embodiment, the method comprises using a pointer selected from the hand parameters determined as described above, for example, the pointer may correspond to a specific POI the position of which is determined as being at a location in between two other POI which may correspond, for example, to the tip of the thumb and the tip of the index finger. When the representation of the pointer reaches an area or a representation of an object compliant with "grabbing" features, the pointer may then be split into at least two pointers associated with at least two of the POI from which the specific POI has been determined. The virtual object may then be "grabbed" and manipulated as described above. The representation of the pointers remains visible until another condition is reached, for example, the pointers being separated by a distance from one another which is greater than a predetermined threshold. When the condition for "grabbing" is no longer relevant, the previous single pointer state is re-established.

In a third embodiment, manipulation interactions, the method comprises using at least one pointer, and preferably two, selected from the hand parameters determined as described above, for example, the pointers may correspond to at least one of the hand tips. The position of the pointers in relation to the virtual object represented on screen may be used for triggering, controlling and stopping the manipulation of at least one parameter of the virtual object. For example, triggering the beginning and the end of the manipulation can be linked to the distance of two pointers to the border of the virtual object; the manipulation may consist in determining the position of the virtual object according to the average positions of the pointers; and the orientation of the virtual object may be determined according to the direction from one pointer to another pointer determined with respect to the horizontal and vertical axis of the display screen.

In another embodiment, the method may comprise "click" interactions using several hand parameters to trigger an event if satisfying a set of specific spatio-temporal conditions. For example, when a pointer is located in an area of the screen where a "click" event is expected to trigger a system event such as the launch of an application, from a folder for example, the detection of a "click" gesture and the associated event can be triggered when the distance between two POI or between two displayed pointers becomes smaller than a predefined threshold for a maximum of a predefined duration.

In one preferred embodiment, the virtual object of the GUI may provide a feedback when the pointers are closer than the size of the virtual object, for example, the object can be squeezed according to the distance between the pointers.

Preferably, the interaction system may also provide visual feedback information such as a change in the rendering of the pointers or of the objects according to the interaction performed. For example, the visual feedback of a virtual object squeeze may be generated when the object is "pinched" by two pointers.

Moreover, interactions may be optimised by contextually analysing respective positions of pointers and virtual objects so as to improve achievement of the interactions enabled by the virtual objects. For example, two pointers close to a virtual object enabling "grabbing" manipulation may be attracted to the borders of the virtual object so as to improve user experience.

Furthermore, tolerances may also be introduced in order to compensate for accuracy of the range finding imaging device or for improving user experience hence allowing interaction with an object without having to make precise contact in the virtual space.

More preferably, the virtual objects interaction ability may be preset at start-up of the interactive system and may be dynamically changed according the interactions and manipulations performed by the user. For example, the object can only rotate and becomes a knob control, the object can only be translated in one direction and becomes a slider, the object can only be pressed and becomes a switch, the object only appears when the pointer is not too far there from, or the object can present different behaviours depending on where it is "grabbed".

For completeness, FIG. 4 illustrates one way of "grabbing" an object by converging at least two hand tips toward the surface of an object. In this case, the hand tips comprise the tip of the thumb and the tip of the "index" finger, but could also be the tip of the thumb and the tip of the middle, ring or little finger. When grabbing a real object, one generally faces no difficulty converging two or more fingers toward opposite sides of an object whereas one generally performs a significantly asymmetrical gesture when performing a grabbing gesture in the air without aiming at a real object. By representing a visual feedback of a virtual object and at least two pointers (FIG. 13), it is possible to regain this ability to converge the pointers towards virtual objects in a similar way to that for a real object.

FIGS. 5a to 5c illustrate the positioning of hand tips, indicated by 501 and palm centres, indicated by 502 and 503, for some hand postures, and FIG. 5d illustrates a fist tip and its associated palm centre 503 and hand tip 503.

Figure 6:
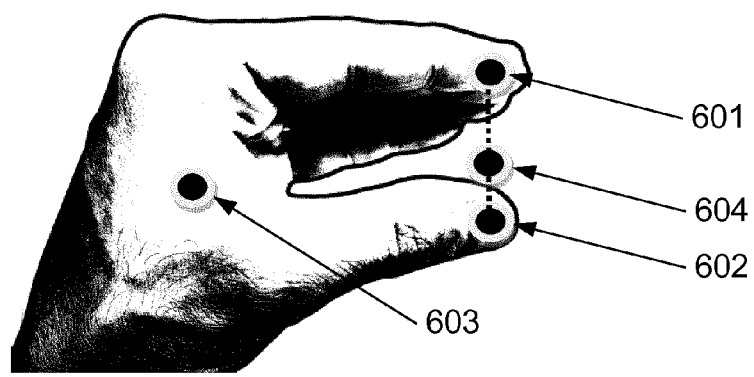
FIG. 6 illustrates a side view of the hand in a "grabbing" posture overlaid with the positioning of the tips of the hand, the palm centre and the positioning of an additional point of interest.

FIG. 6 illustrates a side view of the hand in "grabbing" posture overlaid with the positioning of the hand tips (601), the thumb finger tip (602), the palm centre (603) and the positioning of an additional stable POI computed using several hand tips (604).

Figure 7:
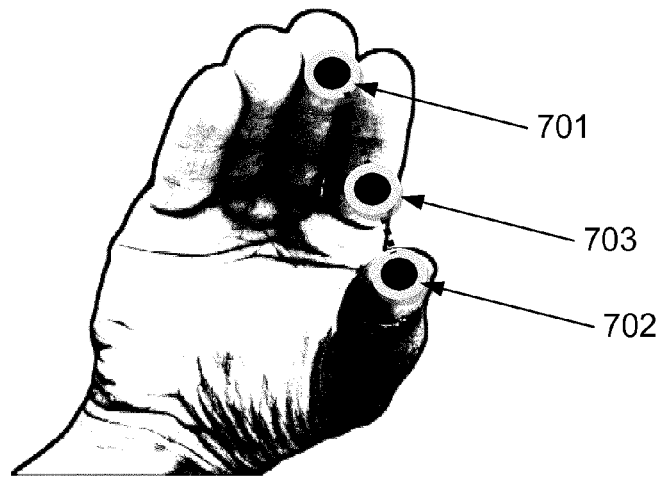
FIG. 7 illustrates a front view of the hand in a "grabbing" posture overlaid with the positioning of a tip of a hand, a tip of a thumb and the positioning of an additional point of interest which can be set as a pointer.

FIG. 7 illustrates a front view of the hand in "grabbing" posture overlaid with the positioning of a hand tip (701), a thumb finger tip (702) and the positioning of an additional stable POI computed using several hand tips (703).

FIG. 8 illustrates the distance map of a hand in which a contour or outline is visible together with the fingers and thumb. The palm is also visible together with a portion which may be considered to be the palm centre as indicated by the highlighted region in the centre of the palm.

Figure 9A:
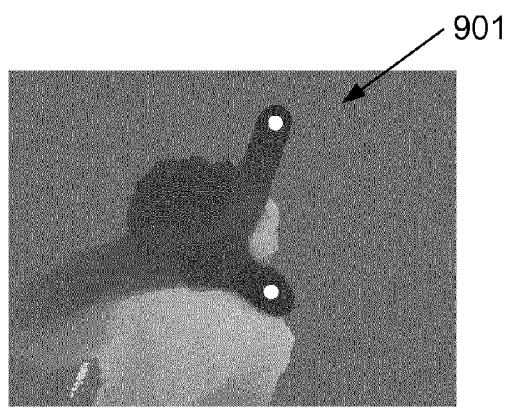
FIGS. 9a and 9b illustrate respectively a depth map of a hand assuming an open "pinching" attitude and the corresponding response map.
Figure 9B:
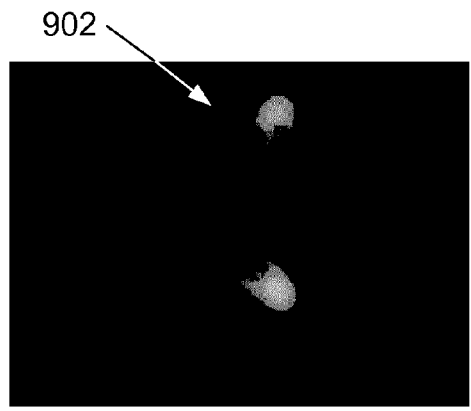

In FIG. 9a, a depth map 901 of a hand assuming an open "pinching" attitude is shown. Here, the POI corresponding to the tips of the index finger and the thumb are shown. FIG. 9b illustrates a response map 902 corresponding to the depth map shown in FIG. 9a. As can be seen, the response map 902 has a clear response signal for the tip of the index finger, the upper grabber, and for the tip of the thumb, the lower grabber.

In FIG. 10a, a depth map 1001 of a hand assuming a closed "pinching" attitude is shown. Only the POI corresponding to the tip of the index finger is visible. FIG. 10b illustrates a response map 1002 corresponding to the depth map of FIG. 10a, and a clear response signal is only obtained for the tip of the index finger.

In FIG. 11a, a depth map 1101 of an open hand on which the POI corresponding to the tips of the hand and the thumb are shown. FIG. 11b illustrates a response map 1102 corresponding to the depth map of FIG. 11a. In this case, clear response signals are obtained from the thumb and the hand tip.

Figure 12A:
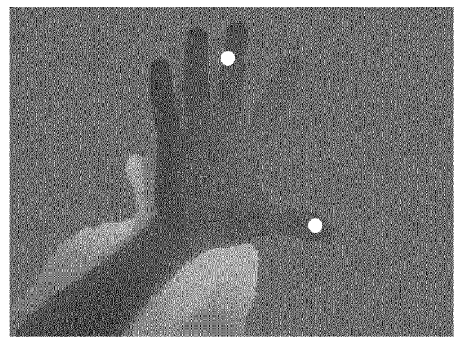
FIGS. 12a and 12b illustrate respectively a depth map and corresponding response map for multiple extremities.
Figure 12B:

In FIG. 12a, a depth map of a hand is shown. FIG. 12b illustrates a response map corresponding to the depth map of FIG. 12a. In FIG. 12b, clear responses are obtained for multiple extremities of the hand, in this case, the thumb and the fingers.

Figure 13:
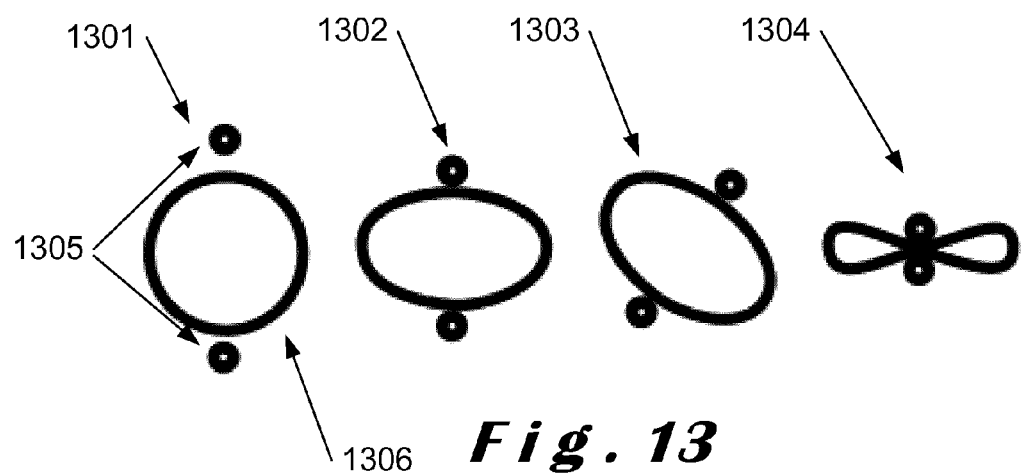
FIG. 13 illustrates some interactions involving the representation of a virtual object and two pointers associated to points of interest determined among hand tips.

FIG. 13 illustrates some interactions involving the representation of a virtual object (indicated at 1306) and two pointers (indicated by 1305) associated to some determined points of interest of the hand. As indicated at 1301, the pointers are not touching the virtual object. At 1302, the two pointers are touching the virtual object, the virtual object providing a visual feedback under the form of a squeezed shape the degree of squeezing being related to the distance in between the considered pointers. In that case, the object may be considered as being grabbed and then can be manipulated according to the further respective position of the pointers. At 1303, the squeezed virtual object is considered as being grasped by the two pointers, and, may then be manipulated according to the respective positions of the pointers as long as the distance between these pointers remains equal to or less than the original size of the object. Manipulation may be, for example, at least one of: a rotation such as show at 1303 when compared to 1302; a translation; a transformation such as a scaling or another transformation contextually allowed by the virtual object.

At 1304, the virtual object is completely squeezed. In one embodiment, this state can be linked to the triggering of a specific behaviour of the object representation, for example, a change in form, and it may further be associated with the triggering of a specific event uncorrelated to the virtual object itself, for example, the launching of an application linked to the user interface.

Figure 14:
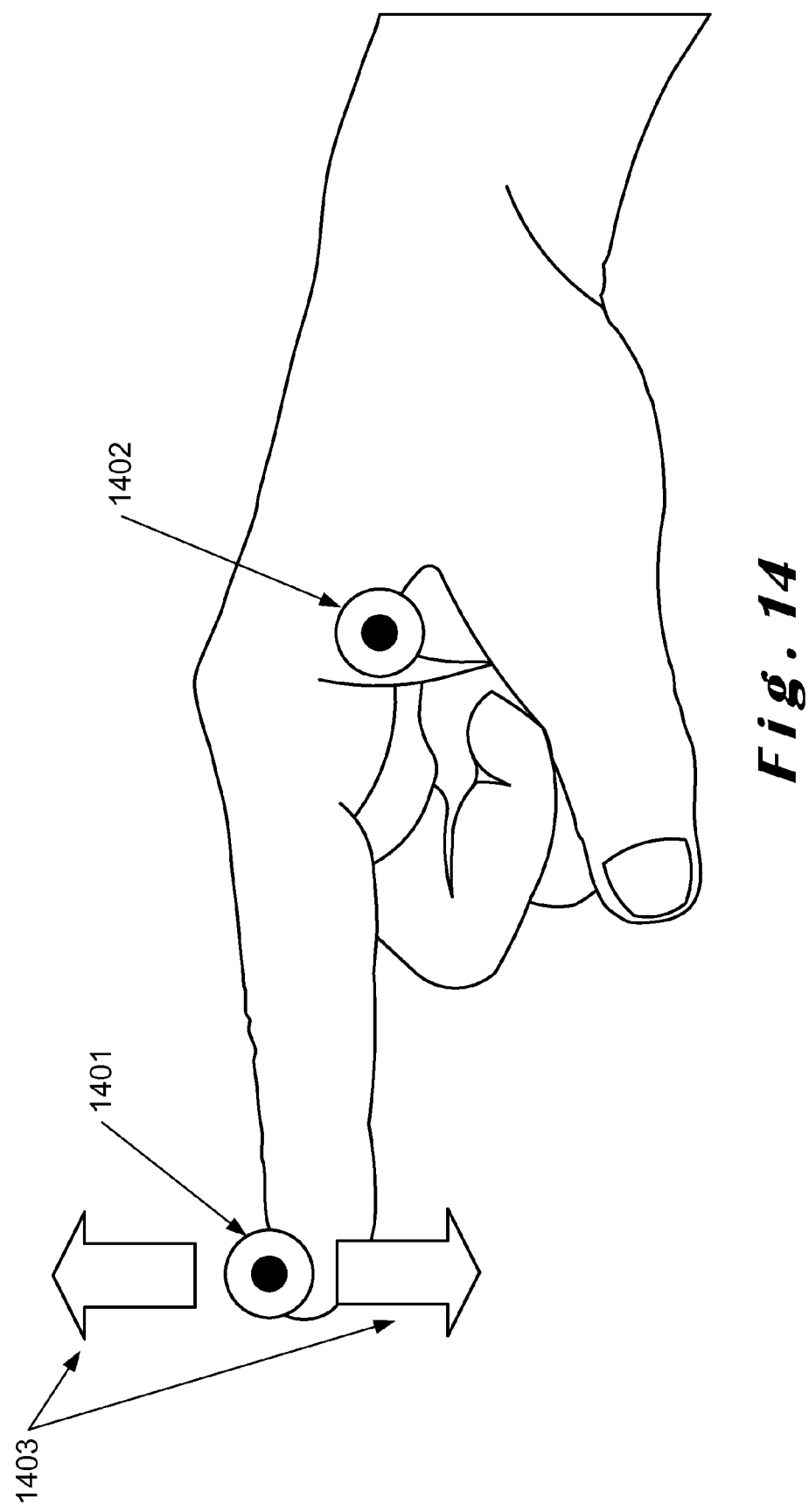
FIG. 14 illustrates a side view of the hand in a posture enabling simultaneous pointing and activation gestures.

In FIG. 14, a side view of a hand of a user is shown which is overlaid with the positioning of a POI 1401 (representing the tip of the index finger tip) which can be used with activation gestures. An additional POI 1402 is also overlaid which is associated with the centre of mass of the hand and which can be used for pointing gestures. Arrows 1403 illustrate up and down finger gestures for "finger snap" activation gestures.

Although aspects of the present invention have been described with respect to specific embodiments, it will readily be appreciated that these aspects may be implemented in other forms.

The invention claimed is:

1. A method for providing natural human-to-computer interaction based on a three-dimensional hand gesture recognition system, the method comprising:
   a) imaging a scene including at least one hand of at least one user;
   b) processing the imaged scene to determine at least three points of interest associated with said at least one hand;
   c) tracking said at least three points of interest to provide a tracked movement of each point of interest with respect to time;
   d) analysing said tracked movement of each point of interest;
   e) determining, from the analysis of said tracked movement of said at least three points of interest, a simultaneous performance of an activation gesture based on two points of interest of the at least three points of interest, and a pointing gesture based on a single point of interest of the at least three points of interest; and
   f) using said determined performance of said activation gesture and said pointing gesture for human-to-computer interaction.

2. A method according to claim 1, wherein any of said at least three points of interest comprise one of: a finger tip; a hand tip; a palm centre: a centre of mass of the hand; and a derivative of a combination of at least two of: the finger tip, the hand tip, the palm centre and the centre of mass of the hand.

3. A method according to claim 2, further comprising determining the position of the palm centre using one of: a distance map and a Principal Component Analysis.

4. A method according to claim 2, further comprising determining a position of the hand tip by determining the position in space corresponding to a predetermined range in a histogram of a vector onto which all orthonormal pixels of the hand are projected, the vector being characterised in that its direction is correlated to the main direction of a Principal Component Analysis performed on a hand three dimensional point cloud, and its origin is located at a position in correlation with the palm centre.

5. A method according to claim 2, further comprising determining hand tips or extremities by computing a response map, each of the hand tips corresponding to a set of pixels the values of which are determined as being a third smallest value of a set of neighbouring pixels, each neighbouring pixel being at a predetermined distance in a set of predetermined directions and having a depth value different from a considered pixel which is above a predetermined value.

6. A method according to claim 1, wherein said single point of interest used for the pointing gesture is interpolated from two points of interest of the at least three points of interest.

7. A method according to claim 1, wherein said two points of interest used for the activation gesture comprise two finger tips, one finger tip and a hand tip, or one finger tip and a palm centre.

8. A method according to claim 1, wherein two said at least three points of interest comprise a palm centre providing the pointing gesture and a finger tip for a snap gesture.

9. A method according to claim 1, wherein said single point of interest corresponds to a palm centre.

10. A method according to claim 1, wherein said single point of interest comprises an interpolated point of interest between two finger tips, said two finger tips providing said activation gesture.

11. A method according to claim 1, wherein said pointing gesture comprises a pointing gesture which is invariant to rotation.

12. A method according to claim 1, wherein said pointing gesture comprises a pointing gesture which is determined using two finger tips, a palm centre and an interpolated point of interest.

13. A method according to claim 1, further comprising providing contextual feedback to a user in response to the performance of a gesture.

14. A method according to claim 13, wherein providing contextual feedback to a user comprises providing the contextual feedback via a graphical user interface comprising virtual objects which are able to render at least one pointer with which the virtual objects interact.

15. A method according to claim 14, wherein an interaction between the virtual objects and the at least three points of interest represented by at least one pointer is a natural interaction which comprises manipulation of the virtual objects including at least one of touching, squeezing, pinching, grabbing, rotating, pushing, dropping, clicking and their derivative gestures.

16. A method according to claim 14, wherein an interaction of the at least one pointer and the virtual objects comprises manipulation of the virtual objects using at least two points of interest represented by the at least one pointer.

17. A method according to claim 14, wherein an interaction of the at least one pointer and the virtual objects comprises manipulation of the virtual objects using at least two control points represented by two pointers or grabbers.

18. A method according to claim 14, wherein an interaction of the at least one pointer and the virtual objects comprises manipulation of the virtual objects using at least two control points represented by two pointers or grabbers and another pointer the position of which is determined as being between the two pointers.

19. A method according to claim 14, further comprising modifying a representation of the virtual objects and the at least one pointer in the graphical user interface according to the gesture performed by the user and their respective position in space.

20. A three-dimensional hand gesture recognition system, the system comprising an imaging system capable of imaging a scene including at least one hand of at least one user and an interactive computer system associated with the imaging system, the interactive computer system being capable of performing the following steps:

i) processing the imaged scene to determine at least three points of interest associated with said at least one hand;

ii) tracking said at least three points of interest to provide a tracked movement of each point of interest with respect to time;

iii) analysing said tracked movement of each of said at least three points of interest;

iv) determining, from the analysis of said tracked movement of said at least three points of interest, a simultaneous performance of an activation gesture based on two points of interest of said at least three points of interest, and a pointing gesture based on a single point of interest of said at least three points of interest; and v) using said determined performance of said activation gesture and said pointing gesture for human-to-computer interaction.

21. A non-transitory computer readable medium storing a program for causing a computer to execute the steps of the method according to claim 1.

* * * * *